United States Patent [19]
Bertetti

[11] Patent Number: 5,927,866
[45] Date of Patent: Jul. 27, 1999

[54] WHEEL HUB BEARING ASSEMBLY

[75] Inventor: Paolo Bertetti, Turin, Italy

[73] Assignee: SKF Industries, Turin, Italy

[21] Appl. No.: 08/976,865

[22] Filed: Nov. 24, 1997

[30] Foreign Application Priority Data

Nov. 26, 1992 [IT] Italy ................................. TO96A0952

[51] Int. Cl.[6] ............................. F16C 33/64; F16C 33/62
[52] U.S. Cl. ......................... 384/537; 384/544; 384/492
[58] Field of Search ................................... 384/544, 589, 384/492, 499, 504, 505, 506, 510, 513, 537

[56] References Cited

U.S. PATENT DOCUMENTS 5,240,333  8/1993  Hassiotis et al. ...................... 384/448
5,490,732  2/1996  Hofmann et al. ...................... 384/537

FOREIGN PATENT DOCUMENTS 0 736 398  10/1996  European Pat. Off. .

*Primary Examiner*—Thomas R. Hannon
*Attorney, Agent, or Firm*—Merchant, Gould, Smith, Edell, Welter & Schmidt, P.A.

[57] ABSTRACT

A ball bearing for the hub (4) of a vehicle wheel comprises a dual set of bearing balls in angular contact wherein the inner race of the axially innermost set (5) of bearing balls consists of an annular member (6) fitted onto the hub (4). The annular member (6) is secured to the hub (4) by a welding (11) performed between the axially inner end portion (14) of the hub (4) and the annular member (6) or a washer (10) adjacent thereto. At least one of the two welded parts has a low carbon content portion at the welding zone.

3 Claims, 2 Drawing Sheets

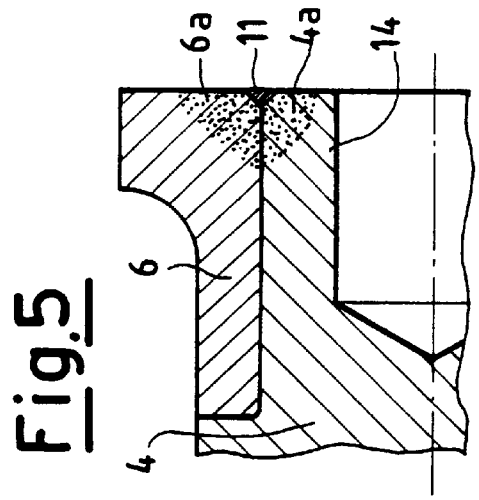
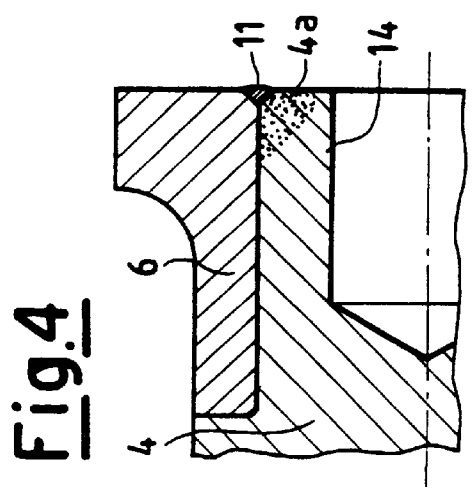
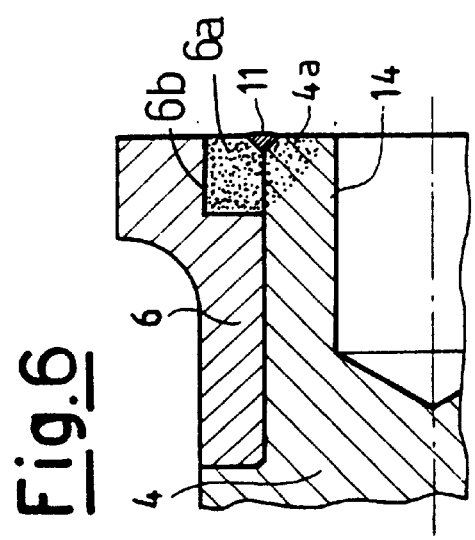

WHEEL HUB BEARING ASSEMBLY

DESCRIPTION

1. Field of the Invention

The present invention falls within the field of vehicle wheel hub bearing assemblies. More particularly, the invention relates to an angular contact ball bearing of the type comprising a dual set of bearing balls wherein the radially inner race of the axially inner set of balls is formed by a distinct annular element inserted onto the hub. With this kind of bearing assemblies, said annular element is the last to be mounted, so as to allow to previously fit the axially outer set of bearing balls.

2. Background of the Invention

There are presently known several methods by which, once the bearing is assembled, the above cited annular element is mounted so as to fix securely the bearing to the hub.

Among the methods known in the art, the one most commonly used is that of using a bolt screwed axially in the inner end portion of the hub, with the head. of the bolt projecting axially of the axially inner side of said radially and axially inner annular element.

This method, although being simple, requires a number of operations to be carried out, which increase manufacturing costs. Further, this method does not allow to reduce the diameter of the inner race beneath a determined value. Therefore, the overall bulk and weight of the bearing remain considerably high. This is due to the fact that it is not possible to reduce beyond a certain extent the thickness of the wall where the threaded bore for accommodating the bolt is formed, as such wall may result too thin and collapse or deform unduly upon tightening the bolt.

Another known method, disclosed in patent publications DE-A-4134434, DE-A-4339847 and EP-A-0736398, provides for cold forming, for example by rolling, the axially inner end portion of the hub so as to form a shoulder for the abutment of the above discussed inner annular element. This method, although allowing to eliminate the conventional central bolt, can in some instances give place to undesired concentration of stresses or deformation of the members directly involved in the cold forming operation, or even those adjacent thereto, as for example the race of the above discussed annular element, unless special provisions are made.

SUMMARY OF THE INVENTION

Against the foregoing background, it is the primary object of the present invention to provide a wheel hub bearing assembly adapted to be assembled onto the hub by a welding operation, so as to reduce the number of operations and assembly costs, and avoid the above discussed prior art inconveniences.

The above and other objects and advantages are achieved in accordance with the present invention by a ball bearing assembly as defined in appended claims 1 and 2.

According to a first aspect of the invention, there is provided a ball bearing for the hub of a vehicle wheel, of the type comprising a dual set of bearing balls in angular contact, the bearing comprising an annular member fitted on said hub and forming the radially inner raceway for the axially innermost set of bearing balls, wherein said annular member is secured to the hub by means of a welding performed between an axially inner end portion of said hub and said annular member, and wherein at least one of said two welded parts has a low carbon content portion at said welding.

According to a second aspect of the invention, there is provided a ball bearing for the hub of a vehicle wheel, of the type comprising a dual set of bearing balls in angular contact, the bearing comprising an annular member fitted on said hub and forming the radially inner raceway for the axially innermost set of bearing balls, wherein said annular member is secured to the hub by means of a welding performed between an axially inner end portion of the hub and an end washer adjacent to said annular member, and wherein at least one of said two welded parts has a low carbon content portion at the welding.

Advantageous embodiments of the invention are defined in the dependent claims.

BRIEF DESCRIPTION OF THE DRAWINGS

In order that the present invention may be well understood there will now be described a few preferred embodiments thereof, given by way of example, reference being made to the accompanying drawings, in which:

FIGS. 3 to 6 are axial cross sectional views similar to that of FIG. 2, of variant embodiments of the invention.

DETAILED DESCRIPTION OF PREFERRED EMBODIMENTS

Figure 1:
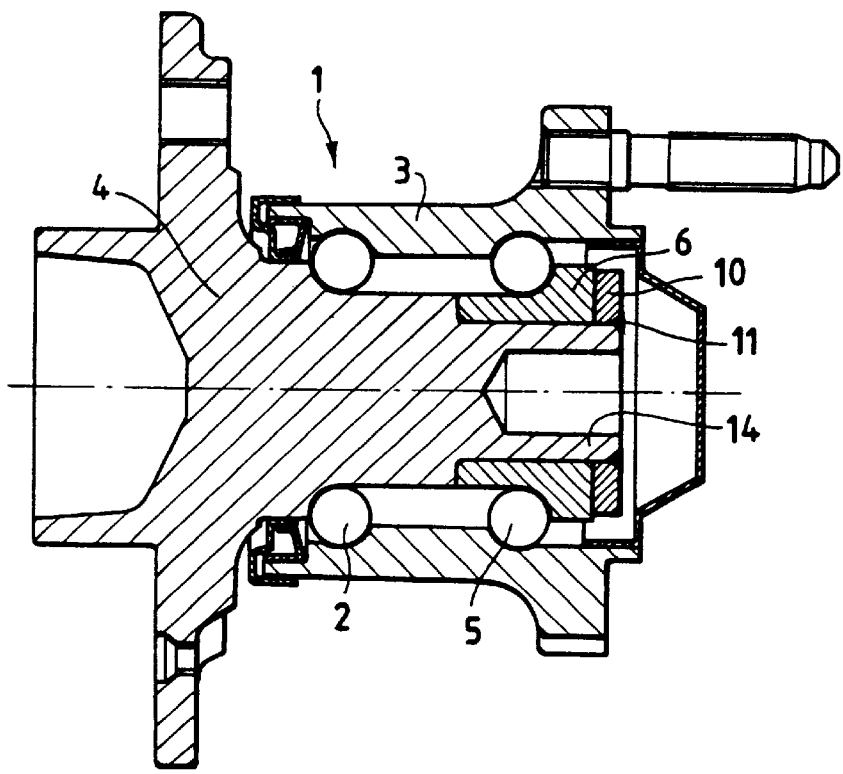
FIG. 1 is an axial cross sectional view of a first embodiment of a bearing assembly according to the present invention.

With reference initially to FIG. 1, numeral 1 designates a bearing for a hub 4 of a vehicle wheel. Bearing 1 is of the angular contact kind having a dual set of bearing balls 2, 5. At its axially outer end, the hub 4 forms a radial flange for providing connection to the wheel (not shown) of a vehicle.

The raceways for the first, axially outer set of bearing balls 2 are formed in the radially outer race 3 and a portion of the hub 4, respectively. The outer race 3 also forms the radially outer raceway for the second, axially inner set of balls 5. The radially inner raceway for this set of balls is provided by a distinct, inner annular element 6 inserted on the axially inner end portion 14 of hub 4.

Figure 2:
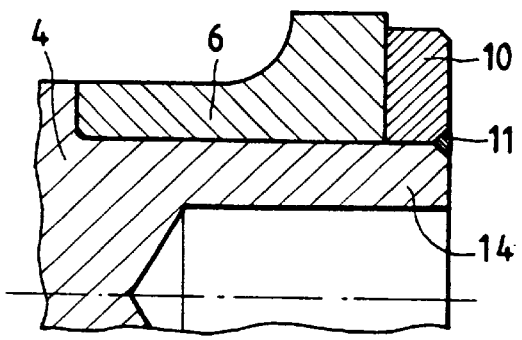
FIG. 2 schematically depicts an axial cross section, to an enlarged scale, of a detail of the bearing assembly of FIG. 1.

Referring particularly to FIG. 2, according to an aspect of the present invention an end washer 10 made of steel with a low carbon content is fitted on the axially inner end portion 14 of hub 4 adjacent to annular element 6. To assemble the hub bearing unit, the washer 10 and the annular element 6 are first preloaded in the axial direction. Then, a welding 11 is performed between the hub end portion 14 and the washer 10. In the embodiment shown in FIG. 2, the washer 10 is flush with the end of hub portion 14, and the welding is performed at the axially inner side of these two members. Preferably, a continuous LASER welding 11 is carried out along the circumference of contact between hub end 14 and washer 10. Being of low-carbon steel, the washer 10 can be welded easily and without the risk of cracks or porosity or discontinuity along the welding. The reason why low-carbon steel is used for welding lies in that no reliable welding could be attained if both welded portions had the high-carbon content of the steel that is normally employed to have sufficiently hard raceways. A low-carbon steel well suited for the washer 10 is the SAE 1020 steel, the carbon content of which preferably ranges between 0.15 and 0.35%.

Figure 3:
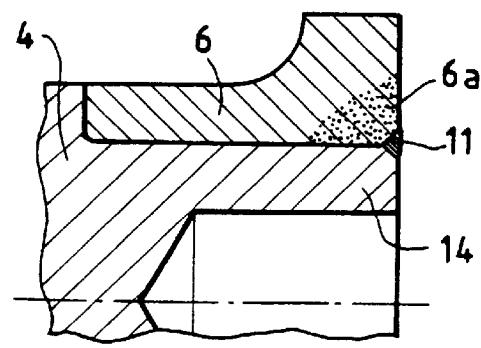

Referring to FIG. 3, in accordance with another aspect of the present invention, the washer of the previous embodiment discussed with reference to FIG. 1 can be eliminated by carrying out the welding 11 directly between the annular element 6 and the hub 4. To this end, at least one of the two elements being welded must provide a low-carbon portion at the welding, as specified in the following.

In FIG. 3 there is disclosed an example in which, to provide the said low-carbon portion, the annular element 6 is made by pressing steel powders of different carbon content so as to determine an end portion 6a of low-carbon content. A steel powder of low-carbon content is so used to form the end portion involved in the welding, whilst a high-carbon steel powder makes up the main part of the annular body 6 forming the raceways. As apparent from the comparision of FIGS. 2 and 3, the embodiment of FIG. 3 provides a further advantage in that it allows to reduce the axial dimension of the hub 4.

In FIG. 4 there is shown an alternative embodiment in which the annular element 6 is of conventional construction, while the hub 4 is produced by pressing steel powders of different carbon content, so as to provide a radially outer portion 4a of low-carbon content steel encompassing the zone of welding 11, while the remainder of the hub is made up of steel powder having a high-carbon content.

In FIG. 5 there is shown a further variant that is a combination of those of FIGS. 3 and 4. According to this further variant, both bodied to be welded are produced by pressing steel powders having different carbon contents. In this way, there are formed two adjacent low-carbon content zones 4a and 6a in the hub 4 and the annular element 6, respectively, that can be welded together, thereby attaining the above mentioned advantages.

A still further variant embodiment is illustrated in FIG. 6. This alternative provides for the annular element 6 being formed in conventional manner (e.g. by pressing or forging of high-carbon steel), but with a radially inner groove 6b of annular shape at the axially inner end of annular element 6. The annular groove 6b is well suited for being filled by pressing low-carbon steel powder therein, so as to form a low-carbon zone 6a for the welding 11 and therefore attain the same advantages as discussed with reference to the embodiments of FIG. 3 or FIG. 6.

Still referring to the embodiment of FIG. 2, wherein a low-carbon steel washer is provided, in order to improve the welding, the washer 10 can be fitted onto the hub 4 with a slight interference so as to determine a slight mechanical penetration of the surfaces in contact before carrying out the welding. It is desired to avoid discontinuities in the welding at the interface of the two bodies owing to the different crystal lattices of the different kinds of steel. This is obviated, as said, by provoking a first, preliminary partial penetration that yields a zone wherein the material successively melt in the welding operation already consists of a mixture of the two different steels, of lower and higher carbon content.

To provide the above mentioned interference, a knurling can be formed in the harder steel, i.e. in the hub (which has a higher carbon content); then, the washer 10 is forcefully fitted on the hub. Alternatively, the hub and the washer can both be axially splined, for example with rectangular or triangular splines (not shown). The axial splines will be suitably shaped either forming an interference coupling or leaving a slight play.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing examples. Accordingly, even if the invention has been explained referring to a bearing assembly in which the hub forms one of the radially inner raceways, the invention can also be applied to bearings wherein both of the radially inner raceways are formed by flanked annular elements fitted on the hub.

I claim:

1. A ball bearing for the hub of a vehicle wheel, comprising, a dual set of bearing balls in angular contact. the bearing comprising an annular member fitted on said hub and forming the radially inner raceway for the axially innermost set of bearing balls, wherein said annular member is secured to the hub by means of a welding performed between an axially inner end portion of said hub and said annular member, wherein at least one of said two welded parts has a low carbon content portion at said welding, wherein said low-carbon portion is formed on the end portion of said hub, said hub being made of pressed steel powders with different carbon contents, and wherein the part of the hub at said welding point is made of a steel powder having a carbon content in the 0.15–0.35% range, the remainder of the hub being of a steel powder with a higher carbon content.

2. A ball bearing for the hub of a vehicle wheel, comprising a dual set of bearing balls in angular contact, the bearing comprising an annular member fitted on said hub and forming the radially inner raceway for the axially innermost set of bearing balls, wherein said annular member is secured to the hub by means of a welding performed between an axially inner end portion of said hub and said annular member, wherein at least one of said two welded parts has a low carbon content portion at said welding, wherein said low-carbon part is the end portion of said annular member, said annular member being formed by pressing steel powder, and wherein the welded portion of said annular member is made of a steel powder having a carbon content in the 0.15–0.35% range, the remainder of said annular member being of a steel powder with a higher carbon content.

3. A ball bearing for the hub of a vehicle wheel, comprising a dual set of bearing balls in angular contact, the bearing comprising an annular member fitted on said hub and forming the radially inner raceway for the axially innermost set of bearing balls, wherein said annular member is secured to the hub by means of a welding performed between an axially inner end portion of said hub and said annular member, wherein at least one of said two welded parts has a low carbon content portion at said welding, wherein said annular element is made up of a high-carbon steel and forms a radially inner groove of annular shape at the axially inner end thereof, said annular groove being adapted for being filled by pressing low-carbon steel powder therein, whereby a low-carbon zone is formed for welding to said hub end portion.

* * * * *